F. KRITZ.
METHOD OF MAKING LOCK SEAM TUBING.
APPLICATION FILED JUNE 29, 1916.

1,263,328.

Patented Apr. 16, 1918.

Witnesses=
O. M. Kappler
Thos. H. Fay

Inventor-
FRANK KRITZ.
by Fay, Oberlin & Fay
ATTORNEYS

UNITED STATES PATENT OFFICE.

FRANK KRITZ, OF DETROIT, MICHIGAN, ASSIGNOR, BY MESNE ASSIGNMENTS, TO THE STANDARD PARTS COMPANY, OF CLEVELAND, OHIO, A CORPORATION OF OHIO.

METHOD OF MAKING LOCK-SEAM TUBING.

1,263,328.   Specification of Letters Patent.   Patented Apr. 16, 1918.

Application filed June 29, 1916. Serial No. 106,554.

*To all whom it may concern:*

Be it known that I, FRANK KRITZ, a citizen of the United States, and a resident of Detroit, county of Wayne, and State of Michigan, have invented a new and useful Improvement in Methods of Making Lock-Seam Tubing, of which the following is a specification, the principle of the invention being herein explained and the best mode in which I have contemplated applying that principle, so as to distinguish it from other inventions.

The present improvements, relating as indicated, to the manufacture of so-called lock-seam tubing, have more special regard to the manufacture of tubing of this sort, which is characterized by having a longitudinally extending channel or groove in one side. Tubing of this form has found an extended field of use in the manufacture of wind shields for automobiles and in other similar connections, the aforesaid channel being adapted to receive the pane of glass forming the shield proper.
One object of the present invention is to provide a method for forming such tubing in continuous lengths out of flat strip stock with channel complete, so as not to require any subsequent manipulation in order to produce such channel. Another object is to avoid the necessity of using a mandrel in the formation of the tubing. By my present improved method, moreover, I secure an extremely strong and efficient lock-seam. To the accomplishment of the foregoing and related ends, the invention, then, consists of the steps hereinafter described and particularly pointed out in the claims, the annexed drawing and the following description setting forth in detail one approved method of carrying out the invention, such disclosed mode constituting, however, but one of various ways in which the principle of the invention may be used.
In said annexed drawing:—

The several Figures 1 to 7, inclusive, represent in cross-section, a strip of stock in various successive stages of manufacture into channeled lock-seam tubing, according to my improved method or process of manufacture.

Figure 1:
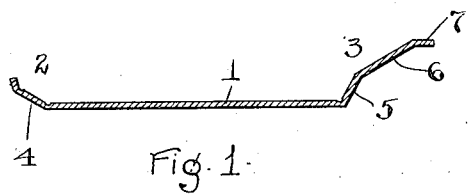

It has not been deemed necessary in connection with the foregoing series of figures to illustrate the flat stock in its original state, but in Fig. 1, I show the result on the body 1 of such stock of the first step of the operation, such step consisting in turning up two similarly directed angular flanges 2 and 3 on the respective edges of the strip. Of such two flanges, the portions 4 and 5 adjacent the body 1 of the strip, which still remains flat or straight in cross-section, are of substantially equal width, while the angularly related portion 6 of the flange 3, the one on the right-hand side in the figure in question, is somewhat wider than the other, and wider than the bottom of the prospective groove or channel. The outer edge 7 of such angularly related portion, is furthermore slightly bent up at this stage, preliminary to forming thereof, in successive stages, a recurved hook which forms part of the lock-seam.

Figure 2:
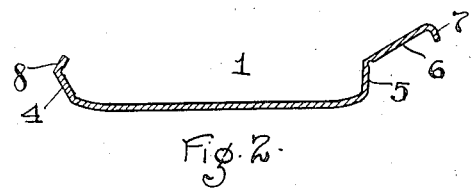
Figure 3:
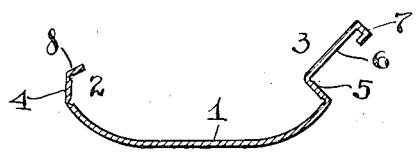

In the second and third stages of the operation, as illustrated in Figs. 2 and 3 respectively, the formation of the flanges is carried on and in addition the body of the strip is by degrees given a curved cross-section.

Figure 4:
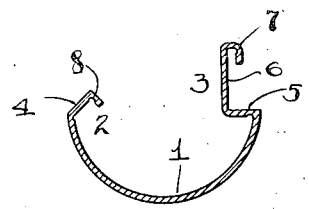

In the fourth stage, as illustrated in Fig. 4, such cross-section becomes practically semi-circular in form, and both flanges are substantially complete in themselves, although not bent inwardly with respect to the body of the strip into the positions which they are finally required to assume.

Figure 5:
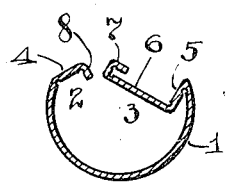
Figure 6:
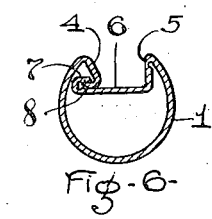
Figure 7:
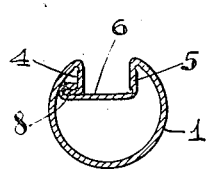

The next two steps, illustrated in Figs. 5 and 6, respectively, consist in bending the angular flanges 2 and 3 inwardly, the latter flange, carrying the angularly related portion 6 that constitutes the bottom of the channel, being turned in in advance of the former flange, so that such flange 3, when brought down into more or less radial position with respect to the central axis of the tube, will engage with its angularly related portion 8, the recurved, hook-like edge 7 of the angularly reated portion 6 of such flange 2. When, accordingly, said flange 2 is forced over toward the left,—that is, away from the side 5,—the inter-engagement or locking of its angularly related portion, with the re-curved portion of the flange 3, will be complete, and the seam thus finished simultaneously with the shaping of the tubing. The latter, in the illustrated construction is of substantially circular form in its general cross-section, (see Fig. 7).

In such finished tubing, it will be observed that one portion of each flange constitutes the respective side-walls, and the angularly related portion 6, of flange 3, the bottom of the channel, the flange portion 6 overlying the angularly related portion 8 of the other flange, and being recurved at its edge 7 so as to interlock therewith at one side of such channel.

All of the several stages illustrated in the manufacture of tubing in accordance with my improved process, may be conveniently and satisfactorily carried out by the use of forming rolls, as need not be explained in detail in the present connection, such rolls having their peripheral faces of proper shape in cross-section to impart to the original plain strip the several different cross-sectional forms illustrated in the figures, and no mandrel being needed.

It will be understood that it is of course a matter of indifference whether the complete operation be divided up into the exact number of steps thus illustrated, or that the strip be left in precisely the form illustrated after each of such successive operation.

Other modes of applying the principle of my invention may be employed instead of the one explained, change being made as regards the method herein disclosed, provided the step or steps stated by any one of the following claims or the equivalent of such stated step or steps be employed.

I therefore particularly point out and distinctly claim as my invention:—

1. The method of making channeled lock-seam tubing, which consists in forming similarly directed, angular flanges on the respective edges of a strip of stock, the edges of such flange-portions being formed for interlocking engagement; and then bending the body of the strip transversely so as to bring the edges of such flanges together.

2. The method of making channeled lock-seam tubing, which consists in forming similarly directed, angular flanges on the respective edges of a strip of stock, the edges of such flange-portions being formed for interlocking engagement; and then bending the body of the strip transversely so as to bring the edges of such flanges together, the main portions of such flanges constituting the respective side-walls, and the angularly related portion of one flange, the bottom, of the channel in the completed tubing.

3. The method of making channeled lock-seam tubing, which consists in forming similarly directed, angular flanges on the respective edges of a strip of stock; recurving the edge of the angularly related portion of one such flange; and then bending the body of the strip transversely so as to bring the other angularly related flange-portion into engagement with such recurved edge, the main portions of such flanges constituting the respective side-walls, and such angularly related portion with recurved edge, the bottom, of the channel in the completed tubing.

4. The method of making channeled lock-seam tubing, which consists in forming flanges on the respective edges of a strip of stock, such flanges each comprising a main portion and a portion disposed at approximately right angles thereto; recurving the edge of the angularly related portion of one such flange; and then bending the body of the strip transversely so as to bring the other angularly related flange-portion into engagement with such recurved edge, the main portions of such flanges constituting the respective side-walls, and such angularly related portion with recurved edge, the bottom, of the channel in the completed tubing.

5. The method of making channeled lock-seam tubing, which consists in forming flanges on the respective edges of a strip of stock, such flanges each comprising a main portion and a portion disposed at approximately right angles thereto, the angularly related portion of one flange being wider than the other; recurving the edge of such last-named flange-portion; and then bending the body of the strip transversely, so as to bring the other angularly related flange-portion into engagement with such recurved edge, the main portions of such flanges constituting the respective side-walls, and such wider angularly related flange-portion with recurved edge, the bottom, of the channel in the completed tubing.

6. The method of making a channeled lock-seam tubing, which consists in forming angular flanges on the respective edges of a strip of stock, bending the body of the strip transversely so as to bring the main portion of such flanges in parallel relation, but spaced apart a distance approximately equal to the desired width of channel; and interlocking the respective edges of such flanges to form a lock-seam.

7. The method of making a channeled lock-seam tubing, which consists in forming angular flanges on the respective edges of a strip of stock, bending the body of the strip transversely so as to bring the main portions of such flanges in parallel relation, but spaced apart a distance approximately equal to the desired width of channel; and interlocking the respective edges of such flanges to form a lock-seam at the one bottom corner of such channel.

8. The method of making channeled lock-seam tubing, which consists in forming on one edge of a strip of stock an angular flange, the main portion of which constitutes the side wall of the desired channel, the angularly related portion of which constitutes the bottom of such channel; forming a flange on the other edge of such strip of stock, which constitutes the other side wall of such channel; bending the body of the strip transversely so as to bring the main portion of such first flange and said second flange in parallel relation, but spaced apart a distance approximately equal to the desired width of channel; and inter-locking the respective edges of such flanges to form a lock-seam.

9. The method of making channeled lock-seam tubing, which consists in forming on one edge of a strip of stock, an angular flange, the main portion of which constitutes the side wall of the desired channel, the angularly related portion of which constitutes the bottom of such channel; recurving the edge of such angularly related flange portion to constitute a lock; forming on the other edge of such strip of stock an angular flange, the main portion of which constitutes the other side wall of such channel, the angularly related portion of which constitutes a tongue adapted to fit in such lock; bending the body of the strip transversely so as to bring the main portions of such flanges in parallel relation, but spaced apart a distance approximately equal to the desired width of channel; and simultaneously inter-engaging such tongue and lock so as to form a lock-seam at the one bottom corner of such channel.

Signed by me, this 24 day of June 1916.

FRANK KRITZ.

Attested by—
  M. H. WILLIAMS,
  C. J. SMITH.